United States Patent [19]

Vannan, III

[11] Patent Number: 5,645,465
[45] Date of Patent: Jul. 8, 1997

[54] METHOD OF CORRECTING CONICITY, RADIAL RUN OUT, AND FORCE VARIATIONS IN A PNEUMATIC TIRE

[75] Inventor: Frederick Forbes Vannan, III, Lawton, Okla.

[73] Assignee: The Goodyear Tire & Rubber Company, Akron, Ohio

[21] Appl. No.: 534,809

[22] Filed: Sep. 27, 1995

[51] Int. Cl.$^6$ ............................................ B24B 49/04
[52] U.S. Cl. ............................ 451/5; 451/920; 451/10
[58] Field of Search ............................ 451/920, 5, 10, 451/1, 65, 49

[56] References Cited

U.S. PATENT DOCUMENTS

| | | | |
|---|---|---|---|
| 3,543,576 | 12/1970 | Bishop . | |
| 3,739,533 | 6/1973 | Iida et al. | 451/28 |
| 3,841,033 | 10/1974 | Appleby et al. | 451/49 |
| 3,946,527 | 3/1976 | Beer | 451/28 |
| 3,948,004 | 4/1976 | Gruber | 451/1 |
| 3,963,427 | 6/1976 | Ugo | 451/28 |
| 4,041,647 | 8/1977 | Ugo . | |
| 4,095,374 | 6/1978 | Ugo | 451/920 |
| 4,112,630 | 9/1978 | Brown, Jr. | 451/920 |
| 4,914,869 | 4/1990 | Bayonnet et al. | 451/1 |
| 4,984,393 | 1/1991 | Rogers, Jr. | 451/1 |
| 5,167,094 | 12/1992 | Wild et al. | 451/920 |
| 5,218,789 | 6/1993 | Ino et al. | 451/920 |
| 5,263,284 | 11/1993 | Wild | 451/49 |

*Primary Examiner*—Robert A. Rose
*Attorney, Agent, or Firm*—Howard C. Cohn; David E. Wheeler

[57] ABSTRACT

A method for correcting the conicity value in a pneumatic tire based on the average conicity value is used in combination with correcting for lateral force variation, and/or radial run-out variation, and/or radial force variation characteristics of a pneumatic tire by grinding the tread surface. The correcting of the conicity value is accomplished by grinding either the shoulder regions of the tire tread or the central region of the tire tread.

22 Claims, 2 Drawing Sheets

METHOD OF CORRECTING CONICITY, RADIAL RUN OUT, AND FORCE VARIATIONS IN A PNEUMATIC TIRE

FIELD OF THE INVENTION

This invention relates to the field of optimizing tire uniformity, and more particularly to a method of correcting or shifting the conicity value, in combination with improving radial run-out, radial force variation, and lateral force variation characteristics of a pneumatic tire by grinding the tread surface in order to improve automobile directional stability.

BACKGROUND OF THE INVENTION

In the art of manufacturing pneumatic tires, rubber flow in the mold or minor differences in the dimensions of the belts, beads, liners, treads, plies of rubberized cords, sometimes cause non-uniformities in the final tire. When non-uniformities are of sufficient magnitude, they will cause force variations on a surface, such as a road, against which the tires roll and thereby produce vibrational and acoustical disturbances in the vehicle upon which the tires are mounted. Regardless of the cause of the force variations, when such variations exceed the acceptable minimum level, the ride of a vehicle utilizing such tires will be adversely affected.

The effects of non-uniformity are best explained by noting that several types of forces, which are of particular importance in the present application, are simultaneously exerted by a tire during its rotation under load against a surface. For example, radial run-out is an intrinsic tire non-uniformity best described as the "out of roundness" of the tire. Also radial forces are exerted in the radial direction of the tire, or in a direction perpendicular to its axis of rotation and non-tangential to the road surface. Additionally, lateral forces are exerted in the axial direction of the tire or in a direction parallel to its axis of rotation. Further, excessive conicity, defined as one-half of the net average lateral force resulting from a non-conical shaped tire, causes a tire to constantly pull to one side.

In a non-uniform tire, the radial run-out, the radial forces, and the lateral forces exerted by the tire will vary or change during its rotation. In other words, the magnitude and/or direction of the radial run-out, and the radial and lateral forces exerted by the tire will depend on which increment of its tread is contacting the surface.

The variations in radial and lateral force during rotation of a tire are usually caused by differences in the stiffness and/or geometry of the tire about its circumference or tread centerline. If these differences are slight, the radial and lateral force variations and therefore the degree of conicity will be insignificant and their effects unnoticeable when the tire is installed on a vehicle. However, when these differences reach a certain level, the radial and/or lateral force variations may be significant enough to cause rough riding conditions and/or difficult handling situations. Also, an excessive conicity value will cause a rolling tire to pull to one side.

Consequently, methods have been developed in the past to correct for excessive force variations by removing rubber from the shoulders and/or the central region of the tire tread by means such as grinding. Most of these correction methods include the steps of indexing the tire tread into a series of circumferential increments and obtaining a series of force measurements representative of the force exerted by the tire as these increments contact a surface. This data is then interpreted and rubber is removed from the tire tread in a pattern related to this interpretation. These methods are commonly performed with a force variation machine which includes an assembly for rotating a test tire against the surface of a freely rotating loading drum. This arrangement results in the loading drum being moved in a manner dependent on the forces exerted by the rotating tire whereby forces may be measured by appropriately placed measuring devices. In a sophisticated force variation machine (FVM), such as a Model No. D70LTW available from the Akron Standard Co. of Akron Ohio. The force measurements are interpreted by a computer and rubber is removed from the tire tread by grinders controlled by the computer. Examples of these methods are disclosed for example in U.S. Pat. Nos. 3,739,533, 3,946,527, 4,914,869, and 5,263,284.

As illustrated by prior patents and commercial devices, as described above, efforts are continuously being made to more efficiently correct tire non-uniformity. None of these prior art efforts, however, suggest the present inventive combination of method steps and component elements arranged and configured for correcting the conicity parameter, as well as the order of the routine for correcting variations in lateral forces, followed by radial run-out and finally radial forces as disclosed and claimed herein. Prior methods and apparatus do not provide the benefits of the present invention which achieves its intended purposes, objectives and advantages over the prior art devices through a new, useful and unobvious combination of method steps and component elements, through no increase in the number of functioning parts, at a reduction in operational cost, and through the utilization of only readily available materials and conventional components.

It is an object of the present invention to provide a method for correcting or shifting the conicity value in a pneumatic tire to obviate the problems and limitations of the prior art methods. Other objects of this invention will be apparent from the following description and claims.

SUMMARY OF THE INVENTION

In accordance with the invention, there is provided a method for correcting or shifting the conicity value of a tire. To determine the conicity, the average lateral force exerted on the load wheel of a force variation machine by the tire turning in both the clockwise and counterclockwise direction is determined and analyzed with a computer program. The computer program then checks or scans a number of preset variables to determine if the conicity needs to be altered. These preset variables include the type of tire, the rate of conicity change for a specific type of tire, and the amount of power used by the motor turning the grinding wheel. The computer then calculates the difference between the actual value of the measured conicity and a specified conicity range or target conicity value. If the actual value of the conicity is within a first specified range, the conicity grind is discontinued and additional corrective grinding procedures are initiated. If the actual conicity is outside of the first specified range but within a second specified range extending above and below the first specified range, the tire is ground to a conicity value within the first specified range. Finally, if the actual conicity is outside of the second specified range, the tire is discarded. While the tire can be ground to within a specified range, it can also be ground to a specific conicity value.

In the case where the tire is to be ground, the computer determines the direction of conicity shift desired and the proper grinder with which to perform the grind. The computer next calculates the amount of time to grind and signals the selected grinder to move into position against the tire. While the selected grinder grinds the surface at a specified power for the determined length of time, the power used by the selected grinder is kept at the specified power level. After the selected grinder has engaged the tire for a determined length of time, the grinder is moved away from the tire and the computer routine is rerun to test the tire and determine the conicity value after the grind. If the computer determines that a further conicity shift is required, the program repeats and another grind is performed.

Further according to the invention, subsequent to the conicity grind, the tire is subjected to three consecutive, corrective grind routines; the lateral force variation corrective grind; the radial run-out corrective grind; and finally, the radial force variation corrective grind. The order of these corrective grinds is an important feature of the present invention.

In accordance with one embodiment of the invention, the grind routine can be used to control a center grinder apparatus to grind a central region of the tire tread between the shoulders of the tire tread to correct for conicity.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
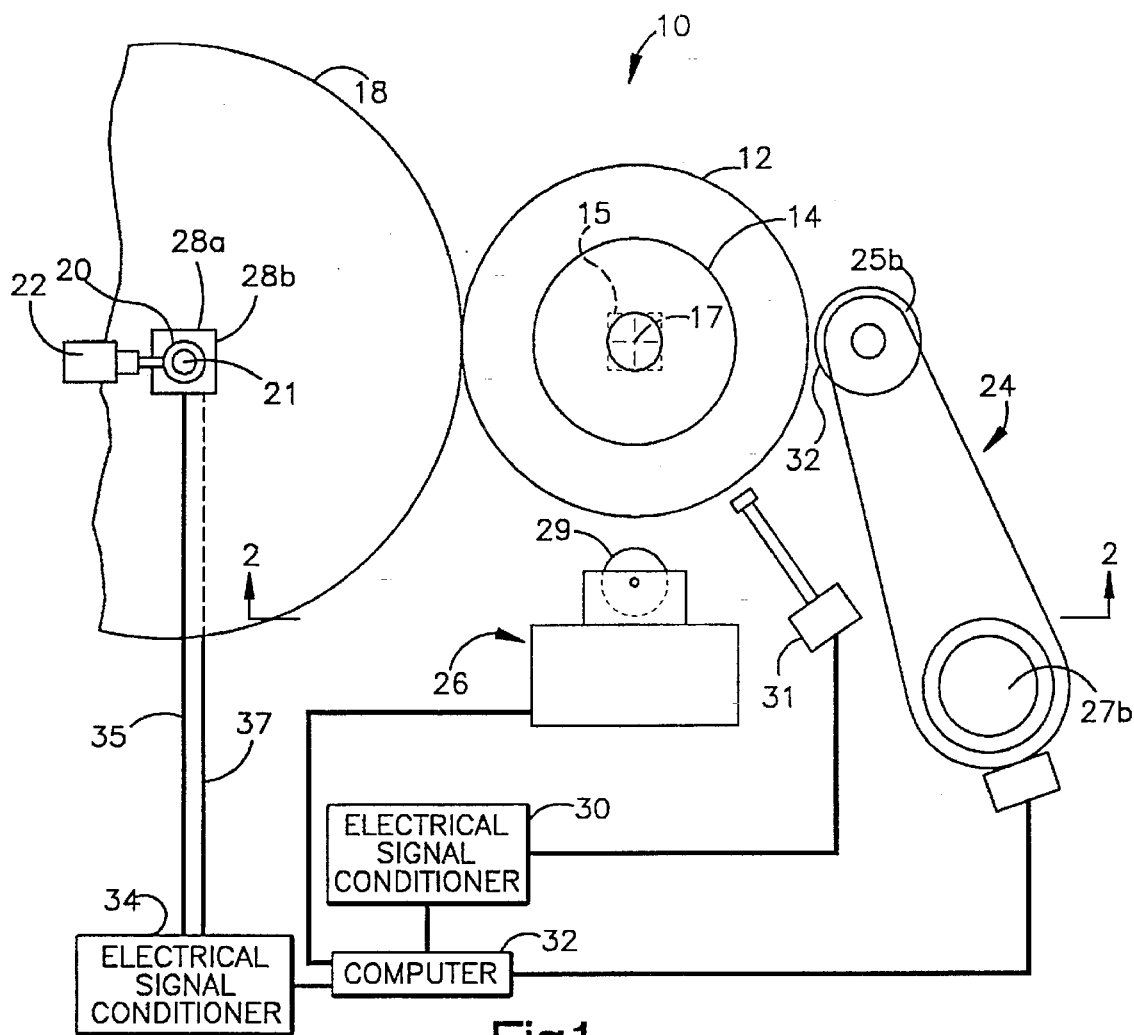
FIG. 1 is a schematic illustration of a top view of a force variation machine with a tire mounted thereon in accordance with the invention.
Figure 2:
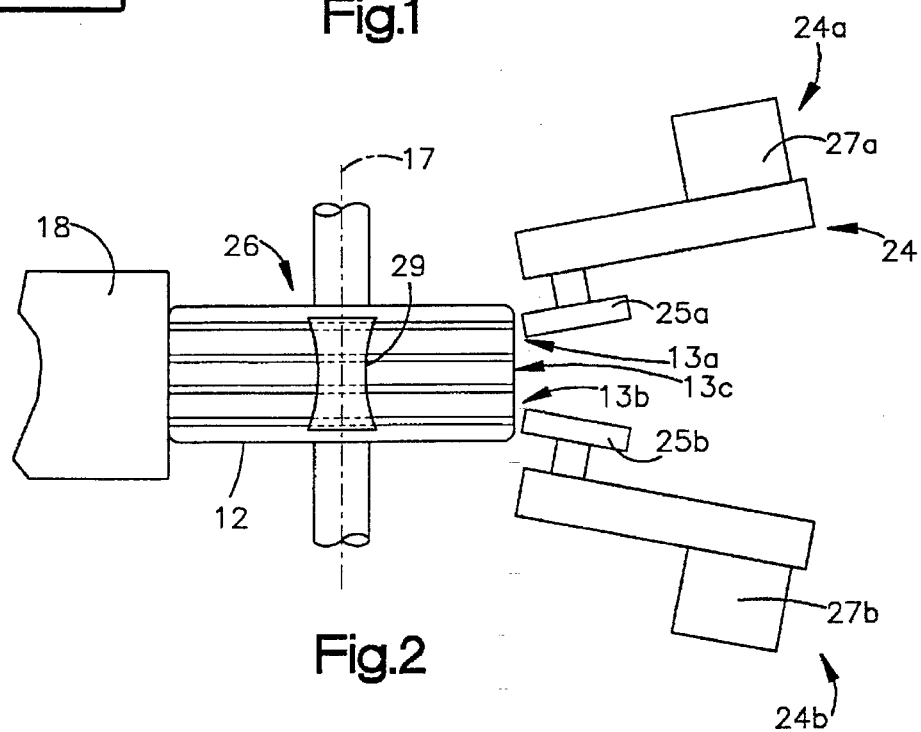
FIG. 2 is a side view through line 2—2 of FIG. 1 illustrating the relative location position of shoulder and center grinder assemblies.

Referring to FIGS. 1 and 2, there is illustrated a force variation machine (FVM) 10 with a tire 12 mounted thereon in accordance with the invention. Tire 12 is a typically a pneumatic tire having a circumferential tire tread with top and bottom shoulder regions 13A and 13B and a central region 13C between the top and bottom shoulder regions. The tire 12 is initially mounted on a rim 14 and inflated to about 30 pounds per square inch (psi). A variable speed motor (not shown) rotates the tire 12 about its axis 17. The tire 12 is placed under load by a load wheel 18, rotatably supported on bearing blocks 20 on either side of the load wheel. The bearing blocks 20 are movable by means, such as electric motors 22 which operate through a device, such as for example a ball-and-screw connection, to move the load wheel 18 into and out of engagement with the tire 12. A shoulder grinding assembly 24 is located substantially 180° with respect to tire 12 from load wheel 18. The shoulder grinding assembly 24 includes top and bottom shoulder grinders 24A and 24B, which include grinding wheels 25A and 25B, respectively, that are powered by motors 27A and 27B and are independently moved into and out of engagement with the shoulder regions 13A and 13B, respectively. The top and bottom shoulder grinders 24A and 24B can be moved into and out of engagement with the shoulder portions by any conventional means, such as hydraulic servo devices (not shown). A center grinder assembly 26 is located approximately 90° counter-clockwise (CCW) from load wheel 18. The center grinder assembly 26 has a grinding wheel 29 that is powered by a motor (not shown) and is moved into and out of engagement with the central region 13C of the tread by conventional means, such as with an hydraulic servo device (not shown).

The load wheel 18 is used to load the inflated tire to a specified force (for example, 600 to 1900 lb) to simulate road conditions against which the tread of the tire rotates. Conventional radial and lateral load cells 28, are mounted on the axle of load wheel 18 on either side thereof to measure the force transmitted to the tire 12 as it rotates against the load wheel. An electric signal conditioner 34 transforms the force measurements sensed by the load cells 28 into electrical signals which can be received and stored in a computer 32. The lateral load cells measure the lateral force exerted by the tire 12 against load wheel 18 in a direction parallel to the axis of rotation extending about which the load wheel rotates. The radial load cells measure the radial force from the point of intersection of the tire 12 and the load wheel 18 exerted by the tire 12 against the load wheel 18 to the axis 17 about which the load wheel rotates.

A radial run-out transducer 31, shown in FIG. 1, is positioned on or adjacent the tread surface of tire 12 for sensing the variations in the tread diameter around the tire's circumference. The transducer 31 outputs the run-out signal through a signal conditioner 30 to computer 32. While a single transducer 31 is illustrated, it is within the terms of the invention to position a separate transducer against each shoulder region 13A and 13B and against the center region 13C of the tire tread so that the run-out of each shoulder and the center region can be checked independently. It is also within the terms of the invention to locate the transducer 31 in spaced relation from the tread to measure the run-out without contacting the tire.

The computer 32 stores the electrical signals received from the signal conditioners 30 and 34 and assigns a force value to each of a large number of increments of the tire circumference. Typically, the tire is indexed into a series of either 120 or 360 circumferential increments of equal length. Each of the increments includes the top and bottom shoulder regions 13A, 13B and the central tread region 13C extending between the top and bottom shoulder regions. Thus, in the case of 120 increments, each corresponds to a 3.0° arc of the tread, and with 360 increments, each corresponds to a 1.0° arc of the tread. Prior to testing, the tire is warmed by rotating at a preset speed, i.e. 60 RPM, for a specified period of time until the tire is at the testing temperature.

The computer 32 is programmed to determine whether the differences in the force values of the various increments are above or below a first set of chosen limits. In the event that the force values of the various increments are above or below the first set of chosen limits, the force values are compared to a second set of chosen limits which are above and below the first set of chosen limits, respectively. In the event the force value is above or below the second set of chosen limits, the tire is scrapped. Two sets of chosen limits are used for conicity, lateral force values, radial run-out, and radial force values. When any of the force values of the tire are outside the first set of chosen limits and inside the second set of chosen limits, computer 32 determines the corrective grinding action to take, as discussed in more detail below. Based on this information, computer 32 sends commands to the shoulder grinding assembly 24 or the center grinder assembly 26 to position the grinding assemblies, as required.

Prior to testing a tire for conicity, the tire is characterized as a type 1 or type 2 tire. Type 1 and type 2 represent a predetermined tire characteristic which gives the computer information about how to control the grinders. The corresponding automatic grinder control are as follows. Type 1 tires react to corrective grinding for conicity so that the top shoulder grinder 24A will cause a positive shift in the conicity value and the bottom shoulder grinder 24B will cause a negative shift in the conicity value. Type 2 tires react to corrective grinding so that the top shoulder grinder 24A will cause a negative shift in the conicity value and the bottom shoulder grinder 24B will cause a positive shift in the conicity value.

THE CONICITY GRIND ROUTINE

Conicity is a calculated value of a tire which indicates the direction and magnitude of pull a tire will exhibit as it rolls. In the conicity grind routine, there are two cycle configurations for correcting or shifting the conicity value of tire 12 to within a selected range by removing rubber from either top or bottom shoulder region 13A or 13B (see FIG. 2) of tire 12, depending on the type of tire (type 1 or 2). The first configuration causes FVM 10 to grind a tire to within a specified conicity range. This feature is activated through the computer software in computer 32 for either type 1 tires or for type 2 tires. The second configuration causes FVM 10 to grind a tire to a specific target conicity value. This feature is also activated through computer 32 for type 1 tires and for type 2 tires. The computer software activates the conicity grind routine based on the cycle configuration selected.

In a preferred embodiment of the invention, the conicity grind routine is a time based grind. The conicity grind routine activates the shoulder grinding assembly 24 to grind the tire in order to change the lateral shift parameter and effect the conicity value of the tire.

To determine the conicity, the lateral load cells 28 measure the lateral force exerted on the load wheel 18 by first rotating the tire 12 in the clockwise (CW) direction. For each segment (typically 1°) into which the tire has been divided, a lateral force value is inputted through signal conditioner 34 into computer 32. The computer calculates an average lateral force (LFCW) or lateral shift (LSCW) value in the CW direction by adding each of the forces and dividing by the number of forces added. Then tire 12 is rotated in the counter-clockwise (CCW) direction and the average lateral force (LFCCW) or lateral shift (LSCCW) is calculated in the same manner. By using the following equation, the conicity is determined.

$$Conicity\ (CV) = [LSCW - ABS(LSCCW)]/2$$

CV=Conicity value
LS=Lateral shift (average lateral force)
CW=Clock-wise direction
CCW=Counter clock-wise direction
ABS=Absolute value For mathematical purposes, the lateral shift in the CW direction has a positive value and the lateral shift in the CCW direction has a negative value. Therefore, the absolute value of the LSCCW is used in the equation. The conicity (also known as the conicity value) can be positive or negative. A positive value of conicity pulls the tire being tested in one direction, whereas a negative value of conicity pulls the tire being tested in the opposite direction. The larger the magnitude of the conicity value, the more the tire will pull in that direction.

It is important to note that the values of lateral shift in the CW and CCW directions, used to compute conicity, are each a single average value (typically in pounds). The lateral shift is not related to the lateral force variation. Lateral force variation is a series of incremental values which form a complex wave form used in the prior art for correcting tires for lateral force variations. The lateral force variation wave form is generated as follows. After the lateral forces at each segment are determined with the tire rotating in the CW direction, the values are inputted into the computer 32. The computer 32 calculates the average value of all the lateral force inputs in the clockwise direction. This average value is called the lateral shift. Then, the average value of the lateral forces in the CW direction is subtracted from the lateral force at each segment and a plot is generated. This plot is a complex lateral force variation wave form which corresponds to the lateral force variation in the CW direction. The same procedure is applied to a tire rotating in the counterclockwise direction to generate a plot of the complex lateral force variation wave form in the CCW direction. The resulting lateral force variation wave forms in the CW and CCW directions are used to grind a tire to correct for lateral force variations, for example, first, second and third harmonics, as is generally known in the prior art.

There are four settings in the computer program being run in computer 32 which control the conicity grind routine. The first setting activates FVM 10 to grind a tire to within a specific conicity range or to a specific target conicity value for type 1 or type 2 tires as previously explained. The second setting is the specific range or target value of conicity desired. The third setting is a grind rate variable which is the number of lb/sec the conicity grind routine is capable of changing in the tire. The fourth setting is the desired grinder power.

Figure 3:
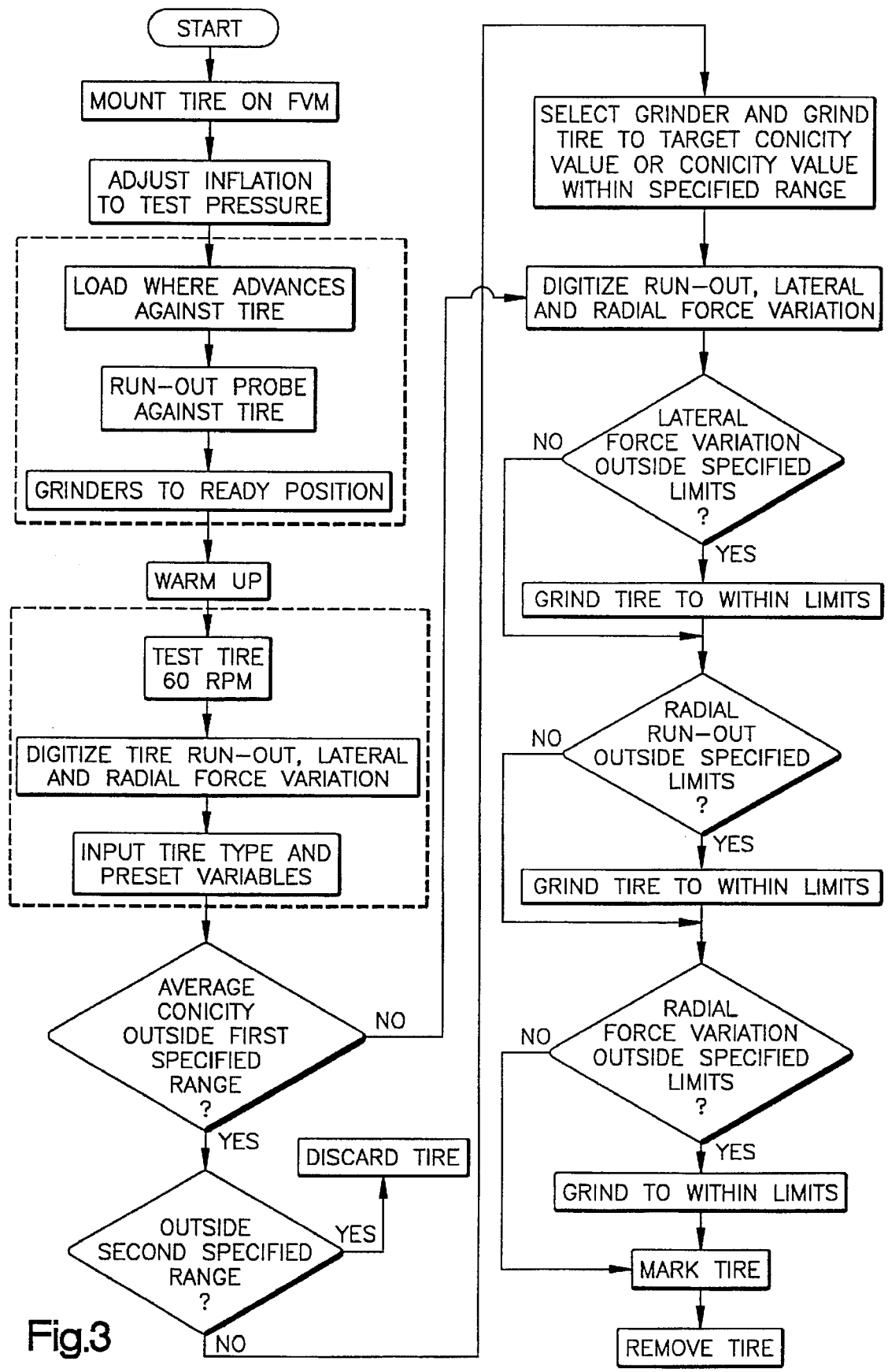
FIG. 3 illustrates a flow diagram of the operation the referenced invention.

The routine for testing a tire, as shown in FIG. 3, is to mount the tire 12 being tested on the FVM 10 and to adjust the tire inflation. Then, the load wheel 18 is advanced against the tire. Run out probe 31 is positioned near or against the tire 12 and the grinder assemblies 24 are disposed in the ready position (see FIGS. 1 and 2). The tire is rotated at about 60 RPM to warm up the tire so as to simulate road conditions. Next, the tire is rotated to digitize the tire. Continuing, the tire is rotated in both the clockwise (CW) and counter clockwise (CCW) directions to measure and generate the total lateral force wave form and total radial force wave form, the run-out, and other parameters in digitized form, as required. Based on this information, the computer calculates the conicity value, as discussed in more detail below. The routine then scans a number of preset variables, previously input into the computer, to determine if the conicity of the tire needs to be altered. These preset variables include the type of tire, the rate of conicity change for a specific type of tire, and the specified power window, i.e. the amount of power used by the motor turning the grinding wheel to grind the tire. The computer 32 then determines the difference between the actual value of conicity and a first specified conicity range or target conicity value. If the actual value of conicity is within the first specified range, the conicity grind is discontinued and additional corrective grinding procedures are initiated. Likewise, if the actual conicity is outside of the first specified range but within a second specified range extending above and below the first specified range, the tire is ground to a target conicity value or a conicity value within the first specified range. Finally, if the actual conicity is outside of the second specified range, the tire is discarded.

CONICITY GRIND ROUTINE WITH SHOULDER GRINDERS

Depending on the type of tire, the computer 32 determines the direction of conicity shift desired and the proper shoulder grinder, i.e. top or bottom grinder 24A,24B, respectively, with which to perform the grind. The computer 32 calculates the absolute value of the difference between the actual conicity value and the specified range or target conicity value and divides it by the grind rate variable to determine the amount of time to grind. The computer 32 then signals the selected top or bottom shoulder grinder 24A or 24B, respectively, and moves it into position against the tire. Next, the selected shoulder grinder grinds the surface at a specified power for a determined length of time. The amount of power used by the motor running the selected grinder is updated in the computer after every revolution of the tire. During operation, the power used to operate the motor running the selected grinder is initially set at a low value. As the grind cycle continues, the grinder is moved into the tire in conjuction with compensating means that insure that the power level operating the grinder is maintained. Once the selected grinder has engaged the tire for a predetermined length of time, the grinder is moved away from the tire and the computer routine is rerun to test the tire in both the clockwise (CW) and counter clockwise (CCW) directions to determine the conicity value after the grind. If computer 32 determines that a further conicity shift is required, the program repeats and another grind is performed. Preferably, after the conicity grind has been carried out twice, the other grind routines are initiated in the specific order described below. It is however, within the scope of the invention, to repeat the conicity grind routine more than two times if desired. During the grinding procedure, the idle shoulder grinder maintains a non-functional minimum power position.

Using symbols, the previous procedure to effect the conicity grind routine is described for using either the top or bottom shoulder grinders 24A, 24B, respectively, to perform a conicity grind on a pneumatic tire. The procedure uses the following symbols:

| | |
|---|---|
| LSCW = | Lateral Shift (average lateral force) of tire rotating in clockwise direction |
| LSCCW = | Lateral Shift (average lateral force) of tire rotating in counter-clockwise direction |
| ABS = | (−1) to shift from negative value to positive value |
| CV = | Actual conicity or conicity value of tire |
| NCV = | Absolute conicity value |
| $SCV_1$ = | Specified acceptable conicity value below which tire is ground |
| $SCV_2$ = | Specified acceptable conicity value above which tire is ground |
| $SCV_3$ = | Specified conicity value below which the tire is not ground |
| $SCV_4$ = | Specified conicity value above which the tire is not ground |
| CLIM = | Preset specified range (between $SCV_1$ and $SCV_2$) of conicity values where tire conicity is acceptable and doesn't require grinding |
| PREP = | Pre-position distance of grinding wheel of selected shoulder grinder with respect to tire being tested |
| LIM = | Preset conicity value between $SCV_1$ and $SCV_2$ |
| NLIM = | Absolute value of preset conicity value (LIM) |
| CGV = | Conicity grind value NLIM-NCV |
| CGEC = | Conicity grind ease constant is the measure of change (in weight) of conicity for a specific type of tire in a given time interval from grinding rubber from the tire with a shoulder grinder driven by |

-continued

| | |
|---|---|
| | a motor at a defined power level |
| RGT = | Required grind time |
| GCPC = | Grind current parameter constant corresponding to the electric current the motor powering the selected shoulder grinder will reach and maintain in a "surface following" grind for conicity |

CONICITY GRIND PROCEDURE

1. Indexing the tire tread of the tire being tested into a series of circumferential increments, each of the increments including the opposite shoulder regions of the tire tread.
2. Measure LSCW corresponding to the series of circumferential increments of the tire tread.
3. Measure LSCCW corresponding to the series of circumferential increments of the tire tread.
4. Calculate CV with the following equation:

$$CV=[LSCW\text{-}Abs\ (LSCCW)]/2.$$

5. Compare CV to CLIM. If CV is within a first preset range of $SCV_1$ through $SCV_2$, discontinue conicity grind procedure and initiate other grind procedures. If CV is outside of a second preset range of $SCV_3$ through $SCV_4$, discontinue conicity grind procedure and initiate other grind procedures. If CV is within a third preset range of $SCV_2$ and $SCV_4$, or a fourth preset range of $SCV_1$ and $SCV_3$, go to step 6.
6. Pre-position (PREP) top and bottom shoulder grinders of grinder apparatus by following steps:
    a) Inputting whether tire being tested is a Type 1 or Type 2 tire.
    b) If Type 1 tire and CV in range $SV_2$ through $SV_4$, PREP bottom shoulder grinder. If Type 1 tire and CV in range $SV_1$ through $SV_3$, PREP top shoulder grinder. If Type 2 tire and CV in range $SV_2$ through $SV_4$, PREP top shoulder grinder. If Type 2 tire and CV in range $SV_1$ through $SV_3$, PREP bottom shoulder grinder.
7. Calculate the conicity grind value (CGV) which equals the difference (in units of weight) between the absolute preset conicity value and the actual conicity value of the tire, i.e. the difference between NLIM and NCV.
8. Input the CGEC (a preset, conicity grind ease constant which is a parameter specific to the tire type which measures the amount (in weight) of conicity that will be removed from a tire of the type being tested in a one second time interval while grinding at a preset GCPC).
9. Calculate the required grind time (RGT) for grinding said selected one of said shoulder regions of the tire being tested with the following equation:

$$RGT=\frac{CGV}{CGEC}$$

10. Input GCPC.
11. Initiate surface following conicity grind with selected shoulder grinder against selected shoulder of the tire while maintaining the GCPC for the determined RGT.
12. Upon completion of conicity grind, retract the selected shoulder grinder from PREP.
13. Retest the tire to determine whether CV of tire being tested is within the preset conicity range CLIM ($SCV_1$ through $SCV_2$).
14. If CV is outside of preset conicity range CLIM, rerun conicity grind procedure.
15. If conicity within preset conicity range CLIM, discontinue conicity grind routine.

While the proceeding procedure is described for correcting the conicity of a tire to a value within a preset conicity range CLIM, it is also within the terms of the invention to correct the conicity of a tire to a specific conicity value.

The conicity grind routine is operated with the tire turning in the CCW direction. The routine can affect the average lateral force or lateral shift of the tire when altering the conicity value. The change in the tire surface caused by the conicity grind can also affect the radial force composite waveform because the grind follows the surface of the tire. The conicity grind routine randomly effects radial force variation (RFV) and lateral force variation (LFV). REV and LFV can increase or decrease based on the specific wave forms of the tire. Any effect on force variation by conicity grind is unintentional and simply a by-product of grinding the tire.

Grinding a tire for RFV and LFV does not typically cause a significant change in the conicity value of the tire. This can be attributed to the fact that the conicity grind is determined by average lateral force, and not the variation in the composite waveform of the tire. However, in some instances, the conicity value can be randomly effected by a RFV or LFV grind.

An important aspect of the invention is that the grinding of a tire for conicity generally affects both LFV and RFV. Therefore, the conicity grind initiates the overall grinding cycle, followed by the LFV grind, the RFV grind, and the run-out grind, as described herein.

ADDITIONAL CORRECTIVE GRINDING PROCEDURES

Subsequent to the conicity grind, the tire is subjected to three consecutive, corrective grind routines; the lateral force variation (LFV) corrective grind; the radial run-out corrective grind; and finally, the radial force variation (RFV) corrective grind. The order of these corrective grinds is an important feature of the present invention.

LATERAL FORCE VARIATION CORRECTIVE GRIND

Subsequent to the conicity grind routine, the FVM is programmed to perform a corrective grind for excessive lateral force variations caused by tire non-uniformity. Lateral force variation occurs due to a variation in the pull of the tire from left to right as the tire rotates against the load wheel. Lateral force variation creates a series of moments along the axis of rotation of the tire.

As described before, the lateral load cells 28 in the load wheel 18 take force readings at incremental units of degrees as the tire rotates through one (1) revolution in both the CW and CCW directions. The incremental force readings generate a complex sine wave referred to as the lateral force variation waveform. Then, the lateral force variation waveform is mathematically displaced with the average of all the incremental force readings. This displacement, known as a lateral shift, is subtracted from each force measurement by the computer program and a lateral force variation waveform for the direction of rotation of the tire is generated. It is important to note that only the peak values of the complex sine wave, occurring after the average lateral force has been subtracted from the complex sine wave, are corrected for in the lateral force variation grind. The average lateral force present in the tire is ignored with respect to the lateral force variation grind.

Because the lateral force variation waveform is a complex sine wave, it can be broken down into harmonics of the complex wave. Typically, the primary concern is with the first force variation harmonic. The lateral force variation waveform forms a control function input to operate the grinder apparatus. The control function input from computer 32 to the top and bottom shoulder grinder assemblies 24A and 24B is the signal input equivalent of the lateral force variation complex waveform. The top and bottom shoulder grinders 24A and 24B, respectively, are used to grind for lateral force variation.

Because of the nature of lateral force variation and its relation to the tire, the top and bottom shoulder grinder assemblies 24A and 24B, respectively, grind to the same input control function. This control function requires the grinder assemblies to grind at separate points around the circumference of the tire. The top and bottom shoulder grinder assemblies 24A and 24B, respectively, pulse into the tire as required by the control function to decrease the lateral force variation.

RADIAL RUN-OUT CORRECTIVE GRIND

Subsequent to the lateral force variation grind, FVM 10 is programmed to perform a corrective grind for excessive radial run-out. Radial run-out is an intrinsic tire non-uniformity, best described as the "out of roundness" of the tire. Radial run-out is measured by the probe assembly 31 shown in FIG. 1. The probe assembly 31 measures the distance between the tread and the radial run-out probe at incremental units around the circumference of the tire as the latter rotates through one (1) revolution. The output of probe assembly 31 is sent through electrical signal conditioner 30 to computer 32. Computer 32 then outputs control signals to center grinder assembly 26. The center grinder assembly 26 is pre-positioned and then hydraulically servo-positioned into tire 12 at incremental units of distance. As center grinder assembly 26 is servo positioned against the tire, the radial run-out high points are removed. Center grinder apparatus 26 continues to be servo positioned in against the tire to perform a lathe type grind on the tire until probe assembly 31 measures a distance variation that is within the specified tolerance for the tire.

RADIAL FORCE VARIATION CORRECTIVE GRIND

After the radial run-out grind, FVM 10 is programmed to grind the tire to reduce radial force variation, an intrinsic tire non-uniformity. Radial force variation occurs due to a variation in the stiffness of the tire around its circumference and about the tires center of rotation.

The radial load cells 28 in the load wheel 18 take force readings at incremental units of degrees as the tire 12 rotates through one (1) revolution. It is important to note that the load on the tire 12 is subtracted from the force readings of the load cells 28, leaving only the variation in force around the circumference of the tire as it rotates through one (1) revolution. The incremental force readings form a complex sine wave referred to as the radial force variation waveform.

Because the radial force variation waveform is a complex sine wave, it can be broken down into harmonics of the complex wave. Typically, only the first, second, and third radial force variation harmonics are of concern. Data describing the radial force variation waveform is transferred to computer 32 which transforms the complex sine wave into a control function input for shoulder grinder apparatus 24. Only the top and bottom shoulder grinder assemblies 24A and 24B, respectively, are used to grind for radial force variation. The control function input from computer 32 to the top and bottom shoulder grinder assemblies 24A and 24B is the signal input equivalent of the radial force variation complex waveform.

Regarding the radial force variation corrective grind, only the complex sine wave (radial force variation waveform) is ground. Further, the top and bottom shoulder grinder assemblies 24A and 24B grind in unison to the same input control function. They do not operate independently when grinding to correct for radial force variation.

CONICITY GRIND ROUTINE WITH CENTER GRINDER

While the first embodiment described above is directed to using the shoulder grinder apparatus 24 to correct the tire for conicity, the conicity grind cycle can also utilize the center grinder apparatus 26 to correct a pneumatic tire for conicity based on the following procedure.

The following procedure is required for use of the center grinder apparatus 26 to perform a corrective conicity grind on a pneumatic tire. The procedure uses the same symbols as with the shoulder grinder apparatus described before.

CONICITY GRIND PROCEDURE

1. Indexing the tire tread of the tire being tested into a series of circumferential increments, each of the increments including the center region and the opposite shoulder regions of the tire tread.
2. Measure LSCW corresponding to the series of circumferential increments of the tire tread.
3. Measure LSCCW corresponding to the series of circumferential increments of the tire tread.
4. Calculate CV with the following equation:

$$CV=[LSCW-ABS\ (LSCCW)]/2.$$

5. Compare CV to CLIM. If CV is within first preset range of $SCV_1$ through $SCV_2$, discontinue the conicity grind procedure and initiate other grind procedures. If CV is outside of a second preset range of $SCV_3$ through $SCV_4$, discontinue conicity grind procedure and initiate other grind procedures. If CV is within a third preset range of $SCV_2$ and $SCV_4$, or a fourth preset range of $SCV_1$ and $SCV_3$, go to step 6.
6. Pre-position (PREP) center grinder apparatus with following steps:
    a) Inputting whether tire being tested is a Type 1 or Type 2 tire.
    b) If Type 1 tire CV in range $SV_2$ through $SV_4$, pre-positioning (PREP) center grinder apparatus to right away from default position at center region of tire tread. If Type 1 tire and CV in range $SV_1$ through $SV_3$, pre-positioning (PREP) center grinder apparatus to left away from default position at center region of tire tread. If Type 2 tire and CV in range $SV_2$ through $SV_4$, pre-positioning (PREP) center grinder apparatus to left away from default position at center region of tire tread. If Type 2 tire and CV in range $SV_1$ through $SV_3$, pre-positioning (PREP) center grinder apparatus to right away from default position at center region of tire tread.
7. Calculate the conicity grind value (CGV) which equals the difference (in units of weight) between the absolute preset conicity value and the absolute value of the actual conicity value of the tire, i.e. the difference between NLIM and NCV.
8. Input the CGEC (a preset, conicity grind ease constant) which is a parameter specific to the tire type being tested which measures the amount (in weight) of conicity that will be removed from that specific type of in a one second time interval while grinding at a preset GCPC.
9. Calculate the required grind time (RGT) for the tire being tested using the following equation:

$$RGT=\frac{CGV}{CGEC}$$

10. Input GCPC.
11. Initiate a surface following conicity grind with center grinder against the center region of the tire while maintaining the GCPC for the determined RGT.
12. Upon completion of the conicity grind, retract the center grinder to its original position.
13. Retest the tire to determine whether CV of the tire being tested is within the preset conicity range CLIM ($SCV_1$ through $SCV_2$).
14. If CV outside of preset conicity range CLIM, rerun conicity grind procedure.
15. If conicity within preset conicity range CLIM, discontinue conicity grind routine.

Subsequent to completing the conicity grind routine with the center grinder, as needed, the cycle continues with grinding for lateral force variations, radial run-out, and radial force variations as discussed with regard to the first embodiment.

It is apparent that there has been provided in accordance with this invention apparatus and methods for correcting or shifting the conicity value in a tire that satisfy the objects, means and advantages set forth hereinbefore. According to the invention, a method for correcting or shifting the conicity value in a tire is used in combination with correcting for lateral force variation, and/or radial run-out, and/or radial force variation characteristics of a tire by grinding the tread surface. The correcting or shifting of the conicity value in a tire is accomplished by grinding either the shoulder regions or the central region between the shoulder regions of the tire tread.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the scope of the appended claims.

We claim:

1. A method for correcting a tire having a circumferential tire tread with top and bottom shoulder regions and a central region between said top and bottom shoulder regions for excessive conicity, said method comprising the steps of:
    a) indexing said tire tread into a series of circumferential increments, each of said increments including said top and bottom shoulder regions;
    b) measuring the average lateral force in the clockwise direction (LSCW) corresponding to said series of circumferential increments of said tire tread;
    c) measuring the average lateral force in the counterclockwise direction (LSCCW) corresponding to said series of circumferential increments of said tire tread;
    d) calculating a conicity value (CV) equal to one half of the difference between said average lateral force in the clockwise direction (LSCW) and said average lateral force in said counterclockwise direction (LSCCW);
    e) comparing said conicity value (CV) to a first preset range of specified acceptable conicity values between $SCV_1$ and $SCV_2$ where said conicity value of said tire is acceptable and wherein:

1) if said conicity value (CV) is within said first preset range of conicity values ($SCV_1$ to $SCV_2$), discontinuing said method of correcting said tire for excessive conicity;

2) if said conicity value (CV) is outside a second preset range of conicity values ($SCV_3$ to $SCV_4$), discontinuing said method of correcting said tire for excessive conicity; and 3) if said conicity value is between a third preset range of conicity values ($SCV_2$ and $SCV_4$) or a fourth preset range of conicity values ($SCV_1$ and $SCV_3$), continuing with step f;

f) pre-positioning (PREP) a grinder assembly including the steps of:

1) inputting whether said tire being tested is a Type 1 or Type 2 tire;

2) inputting said CV as calculated in Step d;

3) selecting which of said top and bottom shoulder regions is to be ground; and

4) PREP said grinder assembly with respect to said shoulder region selected to be ground;

g) calculating a conicity grind value (CGV) equal to the difference between a preset conicity value (LIM) and the actual conicity value (NCV) of said tire;

h) calculating the required grind time (RGT) for grinding said selected one of said top and bottom shoulder regions to be ground by dividing said conicity grind value (CGV) by a preset conicity grind ease constant (CGEC) corresponding to said tire; and i) grinding rubber from said selected one of said top and bottom shoulders regions for said required grind time (RGT).

2. The method of claim 1 wherein said step of selecting which of said top and bottom shoulder regions to be ground includes the steps of:

inputting whether said tire being tested is a Type 1 tire in which grinding said first shoulder region for conicity causes a positive shift in said conicity value and grinding said second shoulder region causes a negative shift in said conicity value or a Type 2 tire in which grinding said first shoulder region for conicity causes a negative shift in said conicity value and grinding said second shoulder region causes a positive shift in said conicity value.

3. The method of claim 2 including the step of grinding said first shoulder region when:

said tire is a Type 1 tire and CV is in range $SV_1$ through $SV_3$; and said tire is a Type 2 tire and CV is in range $SV_2$ through $SV_4$.

4. The method of claim 2 including the step of grinding said second shoulder region when:

said tire is a Type 1 tire and CV is in range $SV_2$ through $SV_4$; and said tire is a Type 2 tire and CV is in range $SV_1$ through $SV_3$.

5. The method of claim 2 including the steps of:

providing said grinder assembly with a top shoulder grinder to move into and out of cutting engagement with said first shoulder region;

providing said grinder assembly with a bottom shoulder grinder to move into and out of cutting engagement with said second shoulder region;

controlling said top shoulder grinder in accordance with a preset conicity grind ease constant (CGEC), said CGEC being a measure of the change in conicity of a tire in a given time interval caused by grinding said tire with said top shoulder grinder being driven by a first motor at a first preset power level; and controlling said bottom shoulder grinder in accordance with a preset conicity grind ease constant (CGEC), said CGEC being a measure of the change in conicity of a tire in a given time interval caused by grinding said tire with said bottom shoulder grinder being driven by a second motor at a second preset power level.

6. The method of claim 5 further including the steps of:

(a) increasing said first and second power levels from an initial value to said first and second preset power levels; and (b) maintaining said first and second power levels substantially constant after said first and second power levels are reached for the remaining grinding of said tire.

7. The method of claim 5 further including the steps of:

rotating said tire in a first direction; and rotating a grinding wheel of said top and bottom shoulder grinders in said first direction.

8. The method of claim 1 further including the steps of retesting said tire being tested by repeating steps a) through e) to determine whether said CV of said tire is within the preset conicity range CLIM.

9. The method of claim 8 further including the steps of:

discontinuing said method of correcting said tire for excessive conicity if said conicity value (CV) is within said first preset range of conicity values ($SCV_1$ to $SCV_2$);

discontinuing said method of correcting said tire for excessive conicity if said conicity value (CV) is outside a second preset range of conicity values ($SCV_3$ to $SCV_4$); and continuing with step f of claim 1 if said conicity value is between a third preset range of conicity values ($SCV_2$ and $SCV_4$) or a fourth preset range of conicity values ($SCV_1$ and $SCV_3$).

10. The method of claim 1 further including the step of providing a tire force variation machine including a freely rotating loading wheel, an assembly which rotates said tire against said loading wheel to measure radial and lateral forces on said loading wheel as said tire rotates against said loading wheel, top and bottom shoulder grinders of said grinder assembly which move independently into and out of cutting engagement with said top and bottom shoulder regions of said tire tread, and a computer into which measurements and preset values are inputted for calculating and comparing operations and for controlling said top and bottom shoulder grinders.

11. The method of claim 1 further including the consecutive steps of:

correcting excessive lateral force variations developed by said tire;

correcting excessive radial run-out of said tire; and correcting excessive radial force variations developed by said tire.

12. A method for correcting a tire having a circumferential tire tread with top and bottom shoulder regions and a central region between said top and bottom shoulder regions for excessive conicity, said method comprising the steps of:

a) indexing said tire tread into a series of circumferential increments, each of said increments including said top and bottom shoulder regions;

b) measuring the average lateral force in the clockwise direction (LSCW) corresponding to said series of circumferential increments of said tire tread;

c) measuring the average lateral force in the counterclockwise direction (LSCCW) corresponding to said series of circumferential increments of said tire tread;

d) calculating a conicity value (CV) equal to one half of the difference between said average lateral force in the clockwise direction (LSCW) and said average lateral force in said counterclockwise direction (LSCCW);

e) comparing said conicity value (CV) to a first preset range of specified acceptable conicity values between $SCV_1$ and $SCV_2$ wherein:
  1) if said conicity value (CV) is within said first preset range of conicity values ($SCV_1$ to $SCV_2$), discontinuing said method of correcting said tire for excessive conicity;
  2) if said conicity value (CV) is outside a second preset range of conicity values ($SCV_3$ to $SCV_4$), discontinuing said method of correcting said tire for excessive conicity; and
  3) if said conicity value is between a third preset range of conicity values ($SCV_2$ and $SCV_4$) or a fourth preset range of conicity values ($SCV_1$ and $SCV_3$), continuing with step f;

f) pre-positioning (PREP) a center grinder assembly including the steps of:
  1) inputting whether said tire being tested is a Type 1 or Type 2 tire;
  2) inputting said CV as calculated in Step d;
  3) selecting a section of said central region with respect to a default position at the center of said central region to be ground; and
  4) PREP said center grinder assembly with respect to said section of said central region selected to be ground;

g) calculating a conicity grind value (CGV) equal to the difference between an absolute preset conicity value (NLIM) and the absolute actual conicity value (NCV) of said tire;

h) calculating the required grind time (RGT) for grinding said selected section of said central region to be ground by dividing said conicity grind value (CGV) by a preset conicity grind ease constant (CGEC) corresponding to said tire; and i) grinding rubber from the selected section of said central region for said required grind time (RGT).

13. The method of claim 12 wherein said step of selecting said section of said central region to be ground includes the steps of:

inputting whether said tire being tested is a Type 1 tire in which grinding said central region to the right of a default position at the center of said central region for conicity causes a positive shift in said conicity value and grinding said central region to the left of a default position at the center of said central region for conicity causes a negative shift in said conicity value or a Type 2 tire in which grinding said central region to the left of a default position at the center of said central region for conicity causes a negative shift in said conicity value.

14. The method of claim 13 including the step of grinding said central region to the right of a default position at the center of said central region when:

said tire is a Type 1 tire and CV is in range $SV_1$ through $SV_3$; and said tire is a Type 2 tire and CV is in range $SV_2$ through $SV_4$.

15. The method of claim 13 including the step of grinding said central region to the left of a default position at the center of said central region second shoulder region when:

said tire is a Type 1 tire and CV is in range $SV_2$ through $SV_4$; and said tire is a Type 2 tire and CV is in range $SV_1$ through $SV_3$.

16. The method of claim 13 including the steps of:

providing said center grinder assembly with a center grinder to move into and out of cutting engagement with said central region; and controlling said center grinder in accordance with a preset conicity grind ease constant (CGEC), said CGEC being a measure of the change in conicity of a tire in a given time interval caused by grinding said tire with said center grinder being driven by a motor at a preset power level.

17. The method of claim 16 further including the steps of:

(a) increasing said power level from an initial value to a preset power level; and (b) maintaining said power level substantially constant after said power level is reached for the remaining grinding of said tire.

18. The method of claim 16 further including the steps of:

rotating said tire in a first direction; and rotating a grinding wheel of said center grinder in said first direction.

19. The method of claim 12 further including the steps of retesting said tire being tested by repeating steps a) through e) to determine whether said CV of said tire is within the preset conicity range CLIM.

20. The method of claim 19 further including the steps of:

discontinuing said method of correcting said tire for excessive conicity if said conicity value (CV) is within said first preset range of conicity values ($SCV_1$ to $SCV_2$);

discontinuing said method of correcting said tire for excessive conicity if said conicity value (CV) is outside a second preset range of conicity values ($SCV_3$ to $SCV_4$); and continuing with step f of claim 12 if said conicity value is between a third preset range of conicity values ($SCV_2$ and $SCV_4$) or a fourth preset range of conicity values ($SCV_1$ and $SCV_3$).

21. The method of claim 12 further including the step of providing a tire force variation machine including a freely rotating loading wheel, an assembly which rotates said tire against said loading wheel to measure radial and lateral forces on said loading wheel as said tire rotates against said loading wheel, a center grinder of said center grinder assembly which moves independently into and out of cutting engagement with said central region of said tire tread, and a computer into which measurements and preset values are inputted for calculating and comparing operations and for controlling said center grinder.

22. The method of claim 12 further including the consecutive steps of:

correcting excessive lateral force variations developed by said tire;

correcting excessive radial run-out of said tire; and correcting excessive radial force variations developed by said tire.

* * * * *